United States Patent [19]

Katsuma et al.

[11] Patent Number: 4,475,803
[45] Date of Patent: Oct. 9, 1984

[54] LIGHT MEASURING DEVICE FOR CAMERA

[75] Inventors: Makoto Katsuma; Akira Hiramatsu, both of Kanagawa; Kazuhiko Arakawa; Hiroyasu Murakami, both of Tokyo, all of Japan

[73] Assignee: Canon Kabushiki Kaisha, Tokyo, Japan

[21] Appl. No.: 450,237

[22] Filed: Dec. 16, 1982

[30] Foreign Application Priority Data

Dec. 22, 1981 [JP] Japan .............................. 56-206129

[51] Int. Cl.³ ........................................... G03B 7/099
[52] U.S. Cl. .................................. 354/481; 354/227.1
[58] Field of Search ............... 354/23 R, 59, 227, 481

[56] References Cited

U.S. PATENT DOCUMENTS 4,174,894 11/1979 Fukuhara et al. .................... 354/59

Primary Examiner—Russell E. Adams
Attorney, Agent, or Firm—Toren, McGeady and Stanger

[57] ABSTRACT

A light measuring device for a camera which can change between light measuring ranges is achieved by dividing a transparent light condensing member into two or more portions of different optical characteristics and electrooptically actuating one or more light shading members for shading the object light passing through the light condensing member to a sensor.

4 Claims, 11 Drawing Figures

LIGHT MEASURING DEVICE FOR CAMERA

BACKGROUND OF THE INVENTION

1. Field of the Invention

The present invention relates to a light measuring device which can vary its light measuring range.

2. Description of the Prior Art

Existing TTL type of light measuring systems which receive light passing through a photographing lens and apply it to a photoelectric transducing element to measure the quantity of the object light. Also known are various kinds of mean light measurement system, including central preference means light measurement systems and partial light measurement systems. In other known light measurement systems means and partial light measurements can be carried out by two kinds of ligh beams. A camera which can change between mean and the partial light measurements has merit in that a desired exposure value can be obtained by an appropriate change. However, in most conventional devices, separate light measuring elements are used the mean and the partial light measurements and their outputs are switched. For example, the photoelectric element for the mean light measurement is arranged in the pentagonal prism view finder optics so as to carry out a mean or central preference light measurement of the object image on the focusing plate, while the photoelectric element for the partial light measurement is arranged mainly to measure the light at the central part of the picture via source optical means by changing between the outputs of the two photoelectric elements a proper exposure by the mean and the partial light measurement is calculated.

However, such conventional devices have the following inconveniences.

Two pieces valuable light sensing elements are needed. Also, two light measureing elements have to be arranged in the limited space of a camera.

Until now a device which can change between the partial and the mean light measurement with one light sensing element would carry out the switchover with a mechanical switch. This makes the mechanism complicated. This is inconvenient with reference to space and manufacturing cost.

Conventional devices also make it difficult to estimate light measurement with the output of the partial light measurement and that of the means light measurement when there is a need for backlight automatic compensation, daylight synchronization mode change over, and sky and ground backlight automatic compensation.

It is, accordingly, an object of the present invention to enable the change of the light measuring ranges by combining a light condensing member having more than two different optical characteristics with an electrooptical element.

Further, other features and objects of the present invention will become clear from the following description of embodiments of the invention when read in light of the accompanying drawings of the embodiments.

DESCRIPTION OF THE PREFERRED EMBODIMENTS

Embodiments of the present invention are described with reference to the accompanying drawings.

Figure 1:
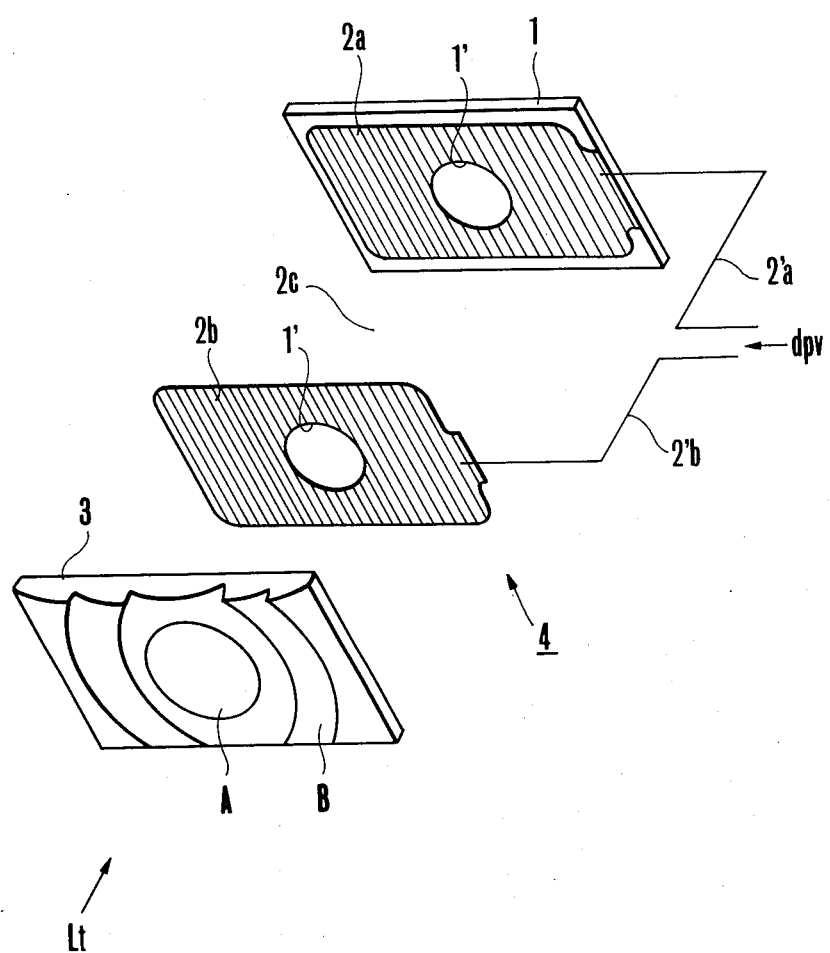
FIG. 1 shows a plan view of an embodiment of an electrooptical light shading device of the present invention.

FIG. 1 is an exploded perspective view of an electrical optical light shading device 4. In the drawing, member 1 is a transparent small square shaped glass plate constituting the light shading plate 4 and 2a and 2b a pair of transparent sheet shaped electrodes having a hole 1' at the center. A condenser lens 3 condenses light Lt, and has different optical characteristics in the middle portion A and at the circumferential portion B.

The transparent electrode 2a is fixed on the glass plate 1, the transparent electrode 2b on the back of the condenser lens 2b and the thin space between the glass plate 1 and the condenser lens 3, namely, between the transparent electrodes 2a and 2b, is filled with a liquid crystal (now shown).

The liquid crystal is mixed with a pigment and the whole light shading device 4 forms a position type black quest host type liquid crystal, namely, of GH-LC construction.

When a liquid crystal cell driving alternating pulse voltage dpv is applied between the terminals 2'a and 2'b of the electrodes 2a and 2b of the above device, only the parts 2a and 2b become black, i.e., assume a light shading state. In other words the circumferential part B is shaded, while only the central part A allows the light Lt to pass. When there is no alternating pulse voltage dpv, the central as well as the circumferential part A and B allow the light to pass.

Figure 2:
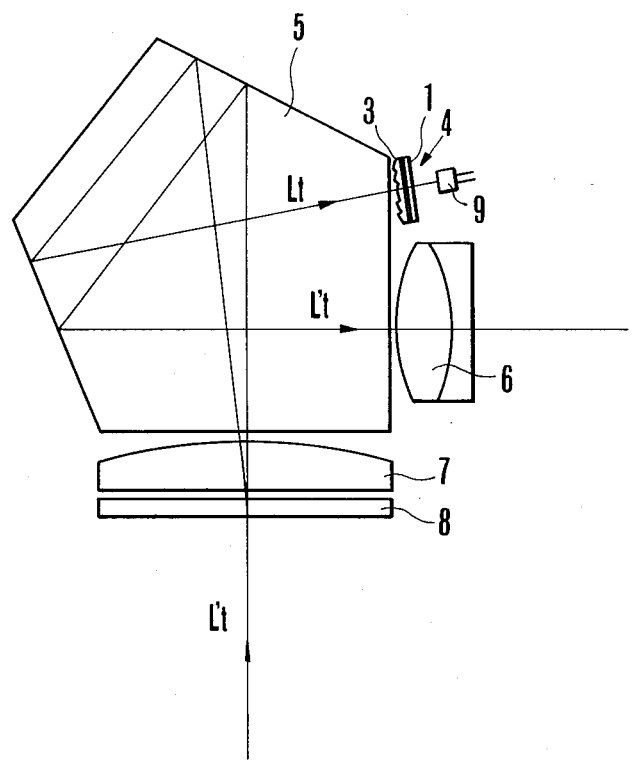
FIG. 2 shows an example of the construction of the device in FIG. 1 mounted in the view finder of a camera.

FIG. 2 shows the electrical optical light shading device 4 in FIG. 1 mounted in the view finder optics of a single lens reflex camera. The drawing includes a pentagonal prism 5, an eye piece lens 6 which is struck by object light from the pentagonal prism, a condenser lens 7 under the pentagonal prism 5, and a focusing plate 8 on which the object image is formed.

The electrical optical light shaded device 4 is arranged above the eye piece lens 6, so the condenser lens 3 is directed to the pentagonal lens 5. A light measuring photoelectric transducing element 9 is directed to the glass plate 1.

Figure 3A:
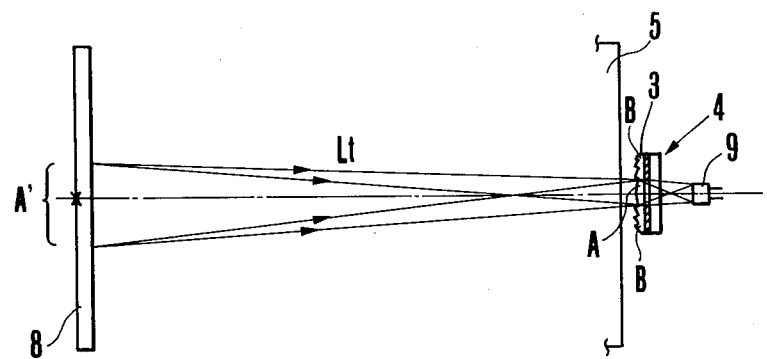
FIG. 3(a) shows a plan view of the light measuring element in FIG. 2 whose light measuring range is for a partial light measurement.

FIGS. 3(a) and (b) illustrates a plane view of the photoelectric transducing element in FIG. 2 and serves for explaining the arrangements light measuring range. FIG. 3(a) shows the case of circumferential part B in FIG. 1 being shaded, while FIG. 3(b) shows the case of the circumferential part B is shaded.

The photoelectric transducer element in FIG. 3(a) is provided in the optical path in which the light is reflected from the reflecting surface of the pentagonal prism. The focusing plate 8 and the light measuring element 9 are in conjugate relection. Thus, the image of the light measuring element 9 is formed on the focusing plate 8. The existing magnification factor depends upon the length of the optical path between the focusing plate 8 and the optical part of the range A, the length of the optical path between the optical part of the range A and the light measuring element 9, the focal length of the optical part of the range A and the focal length of the condenser lens 7. Thus, by properly selecting the length of the optical paths, the focal length of the optical part of the range, and the size of the light measuring surface of the light measuring element 9, the image of the light measuring element 9 can be formed in the desired range of the focusing plate 8 through the normal light reflecting path.

In this way, the partial light measurement is possible by measuring the light in the range A' of the focusing plate 8 as shown in FIG. 3(a).

Figure 3B:
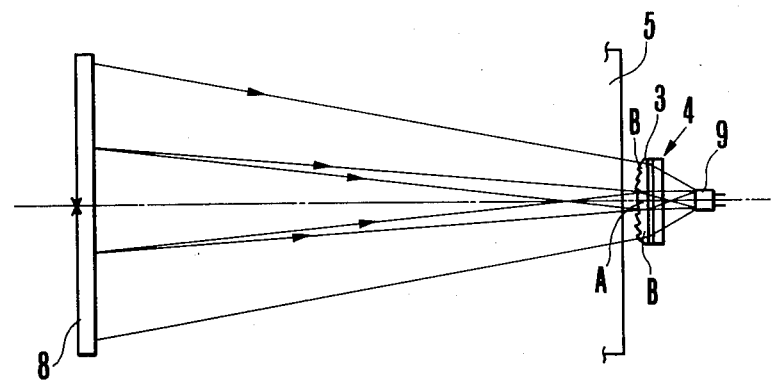
FIG. 3(b) shows a plan view of the light measuring element in FIG. 2 whose light measuring range is for a mean light measurement.

The optical nature in FIG. 3(b) is different from that in FIG. 3(b). Here the light in parts other than the optical part of the range A' can also be measured. No image is formed on the focusing plate 8 as in case of the optical part of the range A. For example, the range B can easily be obtained from the combination of a Fresnel phase, a dispersion plane and a refractory plane with different focal length than that of the optical part of the range A.

In this way, a mean light measurement with preference on the central part becomes possible by making use of both of the optical part of the range A and that of the range B as shown in FIG. 3(b).

Figure 4:
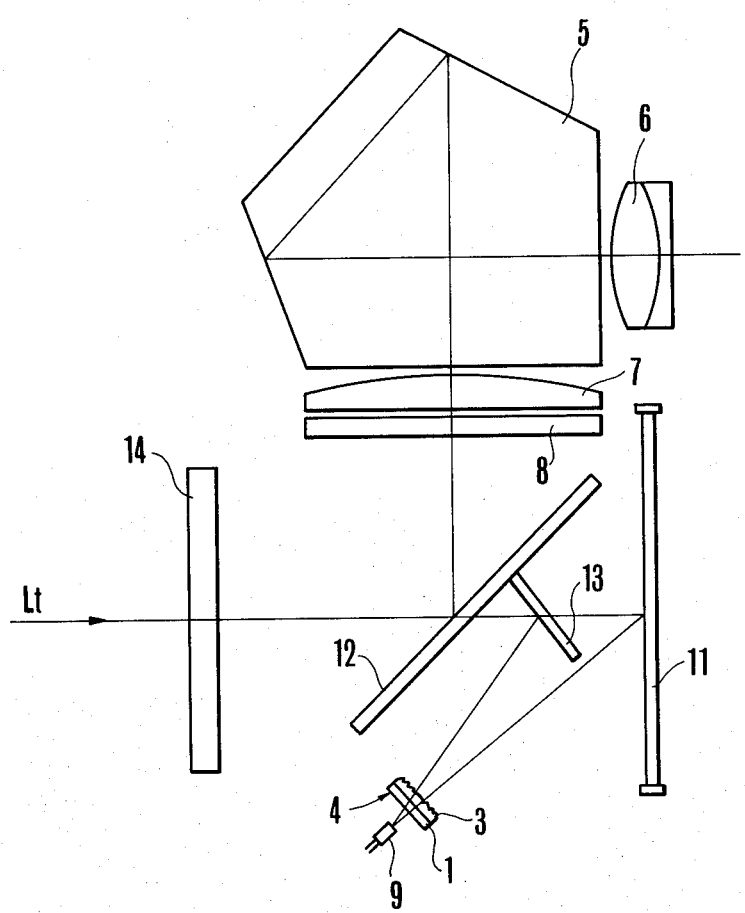
FIG. 4 shows another example of the construction of the device in FIG. 1 mounted in the view finder of a camera.

FIG. 4 shows the outline of the optical arrangement of the light shading device in FIG. 1 applied to a direct light measuring system. Here a mirror 450 reflects object light to the focusing plate. A small sub-mirror 13 is arranged on the reflecting mirror 12 to reflect a part of the object light passing through the mirror 12 to the light shading device 4. A light measuring element 9 is provided behind the light shading device 4 in the same way as in the previous embodiment. A shutter curtain 11 has a surface treated to reflect the object light to the light shading device when the reflecting mirror 12 is raised. Member 14 is mount for a photographic lens.

Figure 5:
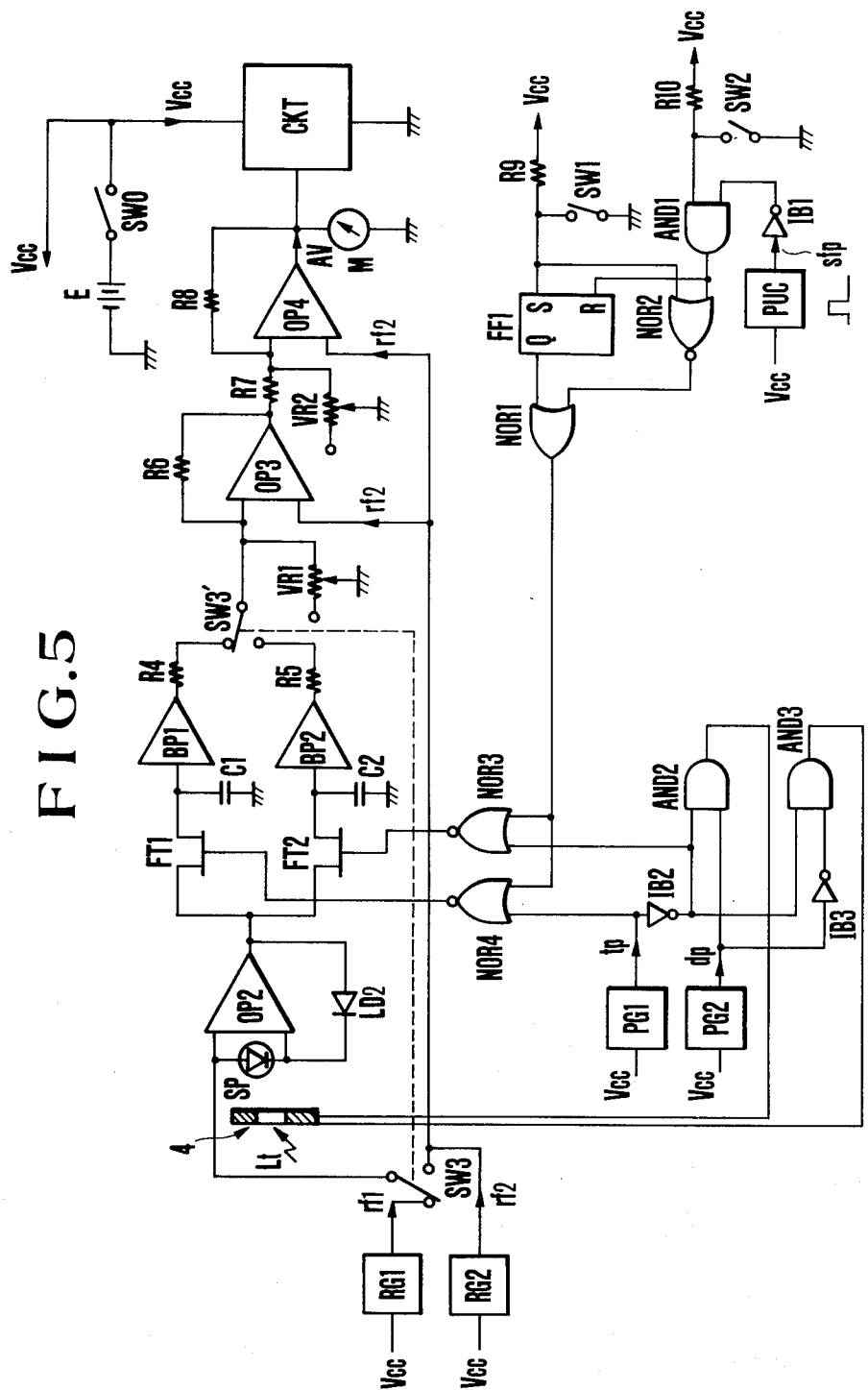
FIG. 5 shows the light measuring circuit of a camera having the device in FIG. 1.

FIG. 5 illustrates a light measuring circuit of a camera using the electrical optical light shading device 4 in FIG. 1. The drawing includes a power source E, a power source sithc SW0 connected in series with the power source and arranged to close first upon depression of the camera release button (not shown) so as to supply a source voltage Vcc to an exposure control circuit CKT, pulse generators PG1, PG2, the single pulse generator PUC, and so on. A switch SW1 is to be closed after the power source switch SW0 upon depression of the release button to ground the voltage Vcc appearing at a resistor R9. A timing switch SW2 is arranged to be opened for example with the film winding and grounding the power source Vcc to earth via the resistance R10.

A constant voltage source RG1 produces a standard voltage and delivers a voltage signal rf1 of the standard level during partial light measurement. A constant voltage source RG2 delivers a voltage signal rf2 of a standard level during the mean light measurement. A selector switch SW3 selectively selects the voltage signal rf1 during the partial light measurement and the voltage signal rf2 at the time of mean light measurement and delivers the signal to an operational amplifier OP2. Further, switch SW3 is in operational engagement with switch SW3' to switch between BP1 and BP2 during partial and the mean light measurements. SP is the light measurement photoelectric transducing element connected between the both input terminals of the operational amplifier OP2 for sensing the light Lt coming through the light shading device 4 so as to alter the photo current. LD2 is a logaritmic diode connected in series with the feedback circuit of the operational amplifier OP2. FT1 and FT2 are respectively an analog gate connected in parallel with the output terminal of the operational amplifier OP2. C1 and C2 are respectively a memory capacitor connected between the respectively analog gate FT1 and FT2 and the earch. BP1 and BP2 are respectively a buffer amplifier connected in series to respective analog gate FT1 and FT2 and the outputs are connected to the 1 input terminal of the operational amplifier OP3 with the changeover of the SW3'. Hereby, to the other input of the operational amplifier OP3 the standard voltage signal rf2 is delivered.

VR1 is the photographing information input variable resistance connected to the 1 input terminal of the operational amplifier. OP4 is an operational amplifier to whose 1 input terminal the output of the operational amplifier OP3 and the photographing information input variable resistance VR2 are connected. Further, to the other input terminal of the operational amplifier OP4 the voltage signal rf2 is delivered. Hereby, the output of the operational amplifier OP4 is connected to the exposure control circuit CKT and the meter M for exposure information display.

PG1 is a pulse generator for delivering the timing pulse of the period of the light shading and the non light shading of the light shading device 4. PG2 is also a pulse generator for delivering the driving pulse dp of the light shading device 4.

PUC is a single pulse generator for delivering a short time pulse stp with the closing of the power switch SW0.

The operation of the light measuring circuit in FIG. 5 is as follows.

Figure 6:
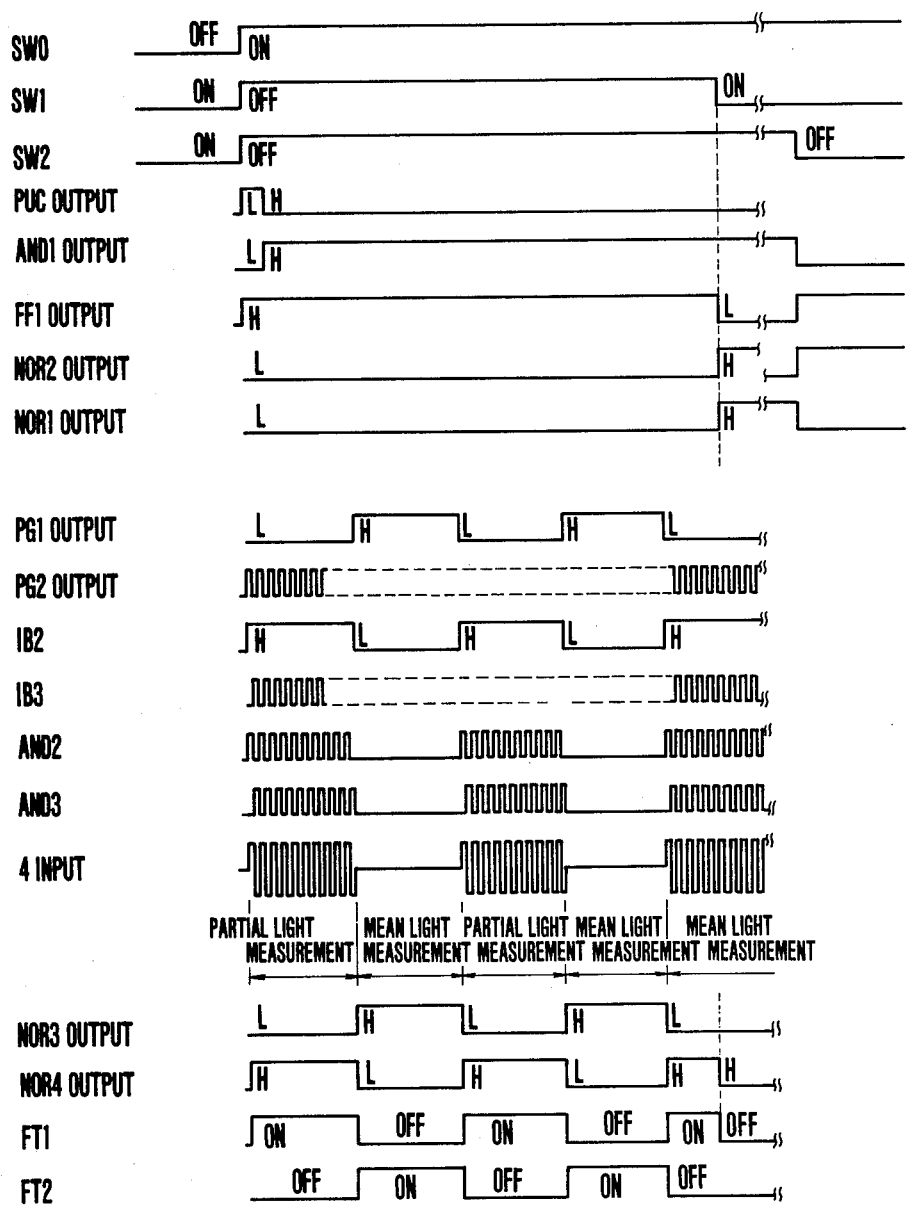
FIG. 6 shows the timing chart of various parts of the circuit in FIG. 5.

When the power source switch SW0 is closed as is shown in FIG. 6 while the changeover switches SW3 and SW3' are in the partial light measuring mode as shown, the single pulse generator PUC delivers a pulse stp. At this time the level of the output of the AND gate AND1 goes low (hereinafter called L or L level) for one pulse and the Q output of the flip-flop FF1 is latched high (hereinafter called H or H level). On the other hand, the switch SW1 is opened so that the output of the NOR gate NOR2 is L, while that of the NOR gate NOR1 is also L.

When, for example, the output tp of the pulse generator PG1, to be operated by closing of the power source switch SW0, changes between "L" and "H" periodically as shown, the output of the NOR gate NOR4 changes between "H" and "L" periodically and the output of the inverter IB2 also switches between "H" and "L" periodically.

In the same way the output dp of the pulse generator PG2 to be operated with the closing of the power source switch SW0 changes periodically between "H" and "L". Now let us suppose that the level of the output of the pulse generator PG1 is L. The low signal is inverted via IB2 and a high is applied to gates AND2 and AND3. Thus, when the pulse generator PG2 which drives the light shading device 4 is "H", the output of age AND2 is "H", while the output of age AND3 is set "L" via inverter IB3. When pulse generator PG2 is "L", the output of AND2 is "L" and the output of gate AND3 is "H". That is, the pulses from pulse generator PG2 come from gates AND2 and AND3 reversed from each other with the result that the light shading device 4 is supplied with alternating pulses. Thus, the light shading device 4 assumes a light shading condition to carry out a partial light measurement. At this time the level of the two inputs of gate NOR4 is L and that of the output of gate NOR4 is H so that gate FT1 is closed. Further, the one input of gate NOR3 is "H" while the output of gate NOR3 is "L" so as to open gate FT2.

When the output tp of the pulse generator PG1 becomes "H" with the next timing the output of gate NOR4 and that of AND2 and AND3 become "L" so that the light shading device 4 assumes the non light shading condition which results in a mean light measurement.

At this time the analog gate FT1 is closed, while the analog gate FT2 is closed.

When the switch SW1 is closed the Q output of flip-flop FF1 is inverted to low and the output of gate NOR1 become "H" so that gate FT1 and gate FT2 are both opened.

As described above, when the pulse generator PG1 is "L" the light shading device 4 assumes a light shading state so as to effect a partial light measurement. Thus, a photo current is produced in the photoelectric transducer element SP, logarithmically compressed in the operational amplifier OP2 with a logarithmic diode LD2 and the level of the output of OP2 is decided by PG1. The analog gate FT1 is closed the output is memorized in the capacitor C1 via FT1. The memorized information is the one (BVS-AVO-AVC) calculated from the object brightness information BVS obtained under the partial light measurement, the smallest F value information AVO of the then mounted lens and the vignetting information AVC. The output NOR3 is then "L" and the analog gate FT2 is open. Thus, the information BVS-AVO-AVC is not memorized.

When the output of pulse generator PG1 becomes "H" at the next timing step, the light shading device 4 assumes the non light shading state so as to carry out the mean light measurement. Hence, in the same way mentioned above a photo-current of the mean light measurement is produced in the photoelectric transducing element sp. Then the information is produced in amplifier OP2 in the same way mentioned above. At this time the analog gate FT1 is opened and the object brightness information BVS-AVO-AVC obtained in the partial light measuring state is stored in C1. The analog gate FT2 is closed so that the information produced in OP2 is stored in the capacitor C2. The then stored information is BVA-AVO-AVC calculated from the object brightness information BVA in the mean light measurement, the smallest F value information AVO and the vignetting information AVC.

When the pulse generator PG1 is again "L", the mean light measurement information BVA-AVO-AVC is stored in capacitor C2 and the new partial light information BVS-AVO-AVC is applied to capacitor C1. The partial light measuring information and the mean light measuring information are entered and stored in C1 and C2 alternatively by synchronizing with the light shading and the non light shading of the light shading device 4.

When the shutter is released at the second step in the stroke of the release button switch SW1 is closed and the S input of flip-flop FF1 is "L" level as shown in FIG. 6. Switch SW2 remains open so that the Q output of FF1 is latched in "L". Then the output of gate NOR1 becomes "H", gate NOR4 and gate NOR3 stop the periodic inversion, the output is held low, and the partial light measuring information BVS-AVO-AVC and the mean light measuring information BVA-AVO-VC are stored in C1 respectively C2. The partial light measuring information BVS-AVO-AVC is applied to operational amplifier OP4 via the operational amplifier, while for example the data AVO, AVC is entered via the buffer amplifier BP1 by setting the variable resistance VR1 and SW3'.

The input of the operational amplifier OP4 receives the photographic information set in the variable resistance VR2, for example, the shutter information Tv and the film sensitivity information, so as to produce an output AV=[BVS-AVO-AVC)+AVC-+AVO+SV−TV)]. The control circuit CKT is controlled by the output AV so as to obtain a proper exposure. The CKT carries out a series of exposure control steps and when the shutter operation is finished SW2 is closed. Then, as shown in FIG. 6 the output of gate AND1 goes low, so when switch SW1 is opened the S input of FF1 goes high and the Q output of FF1 is high. Now the output of gate NOR1 is low so that while SW0 remains open gate NOR4 and gate NOR3 close and open FI1 and FI2 periodically as described so as to repeat the partial and the mean light measurement.

In case switch SW1 is closed the S input of flip-flop FF1 is low. While flip-flop FF1 is not reset, the output of gate NOR2 is "H" and therefore the output of NOR1 "L" level so as to afford the same result as above.

Further, when the selector switches SW3 and SW3' are set in the mean light measuring mode, namely, by switching then switch SW3 to the mean light measurement position, the standard voltage signal rf2 for a mean light measurement is applied to the level input of the operation amplifier OP2. Thus, a means light measurement is possible in the same way as above.

The constant voltage sources RG1 and RG2 are adjusted so that the outputs during mean light measurement and partial light measurement are at the same level when the same brightness dispersion surface is measured. In the present embodiment the partially measured light value and the mean measured light value respectively are stored in the independent memory capacitors so that it is easy to estimate the light measurement by both measured light values.

Figure 7:
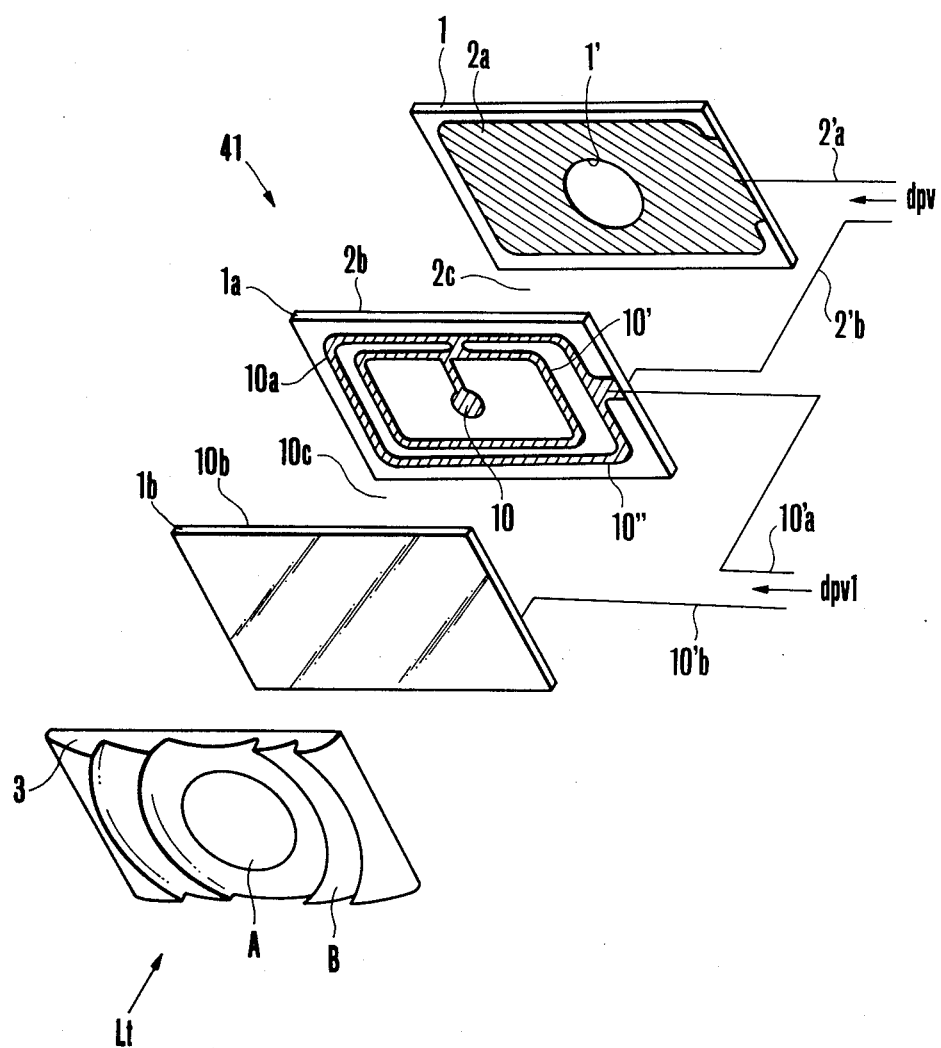
FIG. 7 shows another embodiment of the electrooptical light shading device of the present invention in perspective view.

FIG. 7 shows an exploded perspective view of a second embodiment of the electrooptical light shading device 41 of the present invention.

In FIG. 7 a transparent glass plate 1a has a lower surface on which a transparent electrode 2b is secured, and an upper surface on which a double ring-shaped transparent electrode 10a is secured. The electrode 10a forms a central portion 10 corresponding to a part of the central hole 1' and a double ring 10' and 10" around the central portion 10. The shape is not limited to a ring but can optionally be changed in accordance with the sensitivity distribution. An optionally arranged transparent glass plate 1b has a transparent electrode 10b corresponding to the electrode 10a secured in its lower surface. The thin space 10c between the electrodes 10a and 10b is filled with crystal liquid (not shown). This crystal liquid is of positive type black GH-LC composition, but it goes withoug saying that it can be of TN-LC or EC composition.

In the above device, when the alternating pulse voltage dpv is applied only between the terminals 2'a, 2'b of the electrodes 2a, 2b, only the portion of the electrodes 2a and 2b become black so they assume the light shading state. In other words the circumferential portion B shades the light and only the central portion A allows the light Lt to pass.

When the alternating pulse voltage dpvl for driving the crystal cell is applied only between the terminals 10'a and 10'b of the electrodes 10a and 10b, only the part 10a and 10b becomes black so they can assume the light shading state. In other words the central part A and the circumferential part B shade the light partially and allow the light Lt to pass partially.

Figure 8:
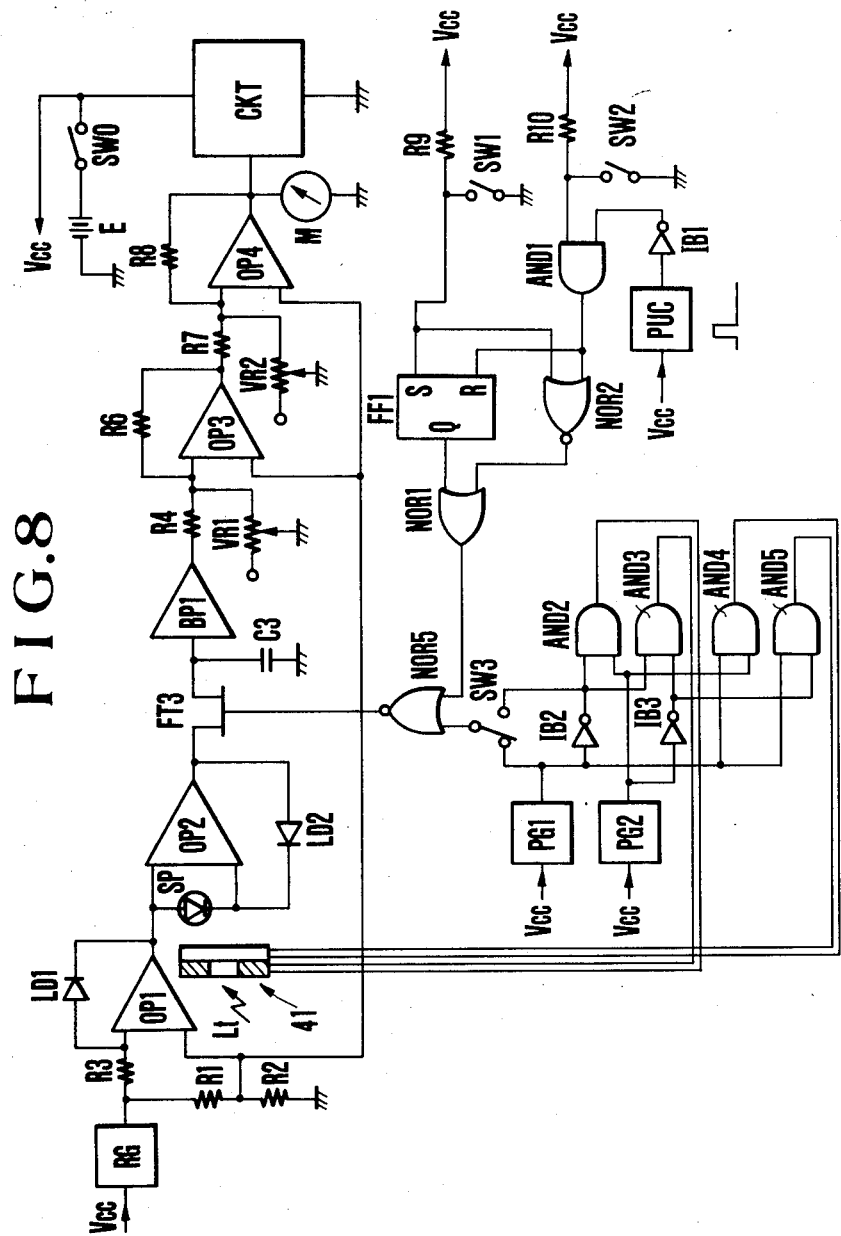
FIG. 8 shows the light measuring circuit of a camera having the device in FIG. 7.

FIG. 8 shows the electrical circuit of a camera to which the electrooptical light shading device 41 in FIG. 7 is applied. Members having the same figures as those in FIG. 6 are the same members.

To speak more generally, FIG. 8 shows the light measuring circuit of a camera having the two phase electrooptical light shading device 41 which adjusts the incident light at the time of the partial light measurement and the mean light measurement so as to produce an output of the same level when the same even dispersion surface is measured.

Figure 9:
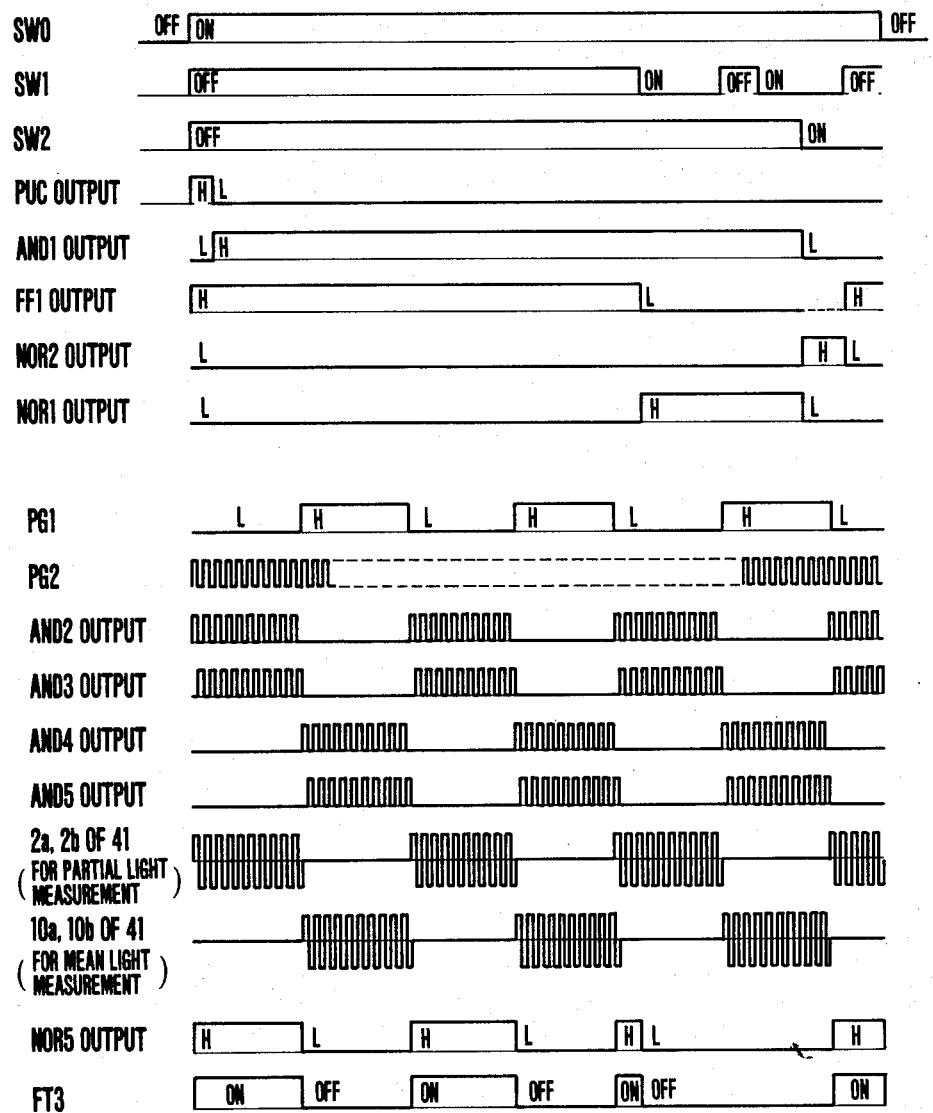
FIG. 9 shows the timing chart of various parts in FIG. 8.

FIG. 8 includes an analog gate FT3, a memory condenser C3, a NOR gate NOR5, and AND gates AND2, AND3, AND4 and AND5. AND gates AND2 and AND3 drive the light shading device 41 during the partial light measurement and gates AND4 and AND5 during the mean light measurement. The partial light measuring mode is selected by SW3. When SW0 is closed by the release button of the camera the pulse generation PG1 and PG2 start to operate in the same way as above. When PG1 is low as shown in FIG. 9 the output NOR5 becomes high so as to close FT3. At this time IB2 is high, so that PG2 delivers a pulse to 2'a in FIG. 7 by AND2 and an inverted pulse to 2'a by AND3. Gates AND4 and AND5 to this a "L" level [low] signal is input by PG1 deliver a "L" signal. Thus, the alternating pulse voltage is applied between the electrodes 2a and 2b the liquid crystal between the electrodes 2a and 2b assumes the light shading state. At the same time, because no voltage is applied between the electrodes 10a and 10b the non light shading state is obtained. Namely, the light shading device 41 assumes the light shading state for the partial light measurement. The light measurement information for the partial light measurement is entered in the memory condenser C3.

When PG1 becomes "H" level [high] with the next timing the output of NOR5 becomes low, FT3 is opened and the partial light measurement information is stored in C3. At this time the output of IB2 is low and the output of AND2 and AND3 is low, the light shading state between the electrodes 2a and 2b of the light shading device 41 is released. On the other hand the 1 input of gates AND4 and AND5 is high, gate AND4 applies the pulse of pulse generator PG2 to electrode 10'a in FIG. 5 and the inverted pulse of PG2 to electrode 10b. Thus, an alternating pulse voltage is applied between the electrodes 10a and 10b so as the part between the electrodes 10a and 10b assume the light shading state. Namely, the light shading device 41 assumes the light shading state for the mean light measurement. However, because gate FT3 is opened the then mean light measurement information is not applied to the memory condenser C3. When PG1 is again low gate FT3 is closed and the partial light measurement information is stored in condensor C3. As described above condenser C3 only stores the partial light measurement information. After that, the exposure control by the partial light measurement is carried out in the same way as in FIG. 6.

Figure 10:
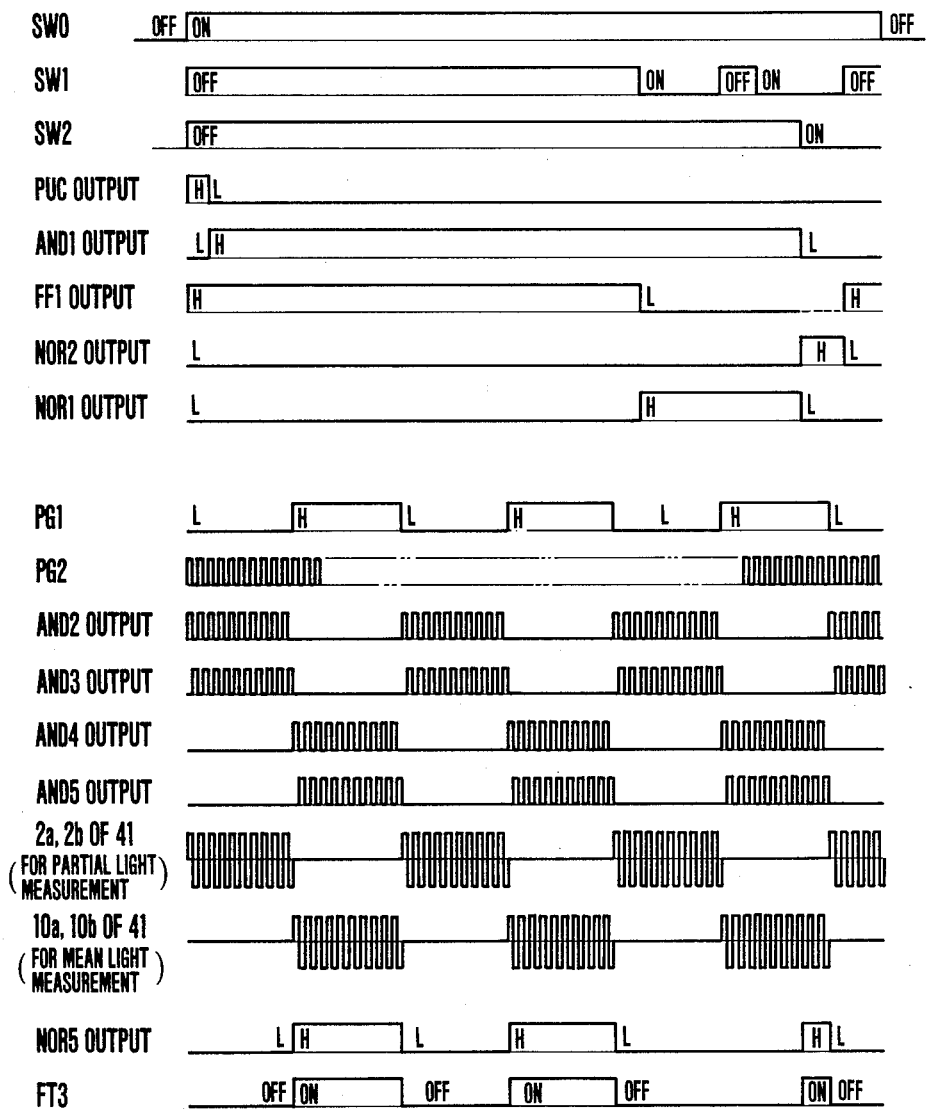
FIG. 10 shows the timing chart of various parts in FIG. 8.

Then the mean light measurement mode is selected by Switch SW3. Switch SW0 is closed so as to start the light measurement. As is shown in FIG. 10, when PG1 is "H" level the light shading device 41 assumes the light shading state for the partial light measurement. However, at this time a "H" level is applied to gate NOR5 via IB2 and SW3. However, the output of gate NOR5 is "L" level and gate FT3 assumes the opened state and the partial light measurement information is not applied in the memory condenser C3. When PG1 becomes high with the next timing pulse the light shading device 41 assumes the light shading state for the mean light measurement in the same way. At this time gate NOR5 is "L" level via IB2 and SW3 so that its output is high and by closing FT3 the mean light measurement information is stored in the memory condenser, when pulse generator PG1 becomes low again gate FT3 is opened and the mean light measurement information is stored in condenser C3 in the mean light measurement mode. After the mean light measurement exposure control is carried out in the same way as above.

Thus, in the embodiment in FIG. 1, the partial light measurement is made by the optical system in the part A, while the mean light measurement is made by the optical systems in the parts A and B. Therefore, an electric amplifier circuit for adjusting the output is needed because the output levels for the same dispersion brightness are different with reference to the partial and the mean light measurement, while the light measuring sensitivity distribution at the time of the mean light measurement is optically somewhat restricted in the part B of the condenser lens so that an optical light measuring sensitivity distribution can not be obtained.

However, when the two phase construction shown in FIG. 7 is adopted, it is possible not only to obtain the same light measurement output level by partially shading the light at the time of the mean as well as the partial light measurement but also to change the light measuring sensitivity distribution optionally in accordance with the securing state of the transparent electrode 10a.

As described above in detail the present invention has the following merits.

1. The construction is simplified by making use of liquid crystal or EC (electrochromics) as the electrooptical light shading member. This is advantageous with reference to space and manufacturing costs.

2. The mean as well as the partial light measurement output can be obtained periodically by periodically driving the electrooptical light shading member the light measurement operation can be done electrically in a simple way by synchronizing with the output.

3. The light measurement output can be adjusted optionally when the dispersion surface is measured with the same light quantity at the time of the mean as well as the partial light measurement so that it is not necessary to provide a circuit for compensating the output of the photoelectric element at the time of the partial light measurement in comparison with the time of the mean light measurement by making the level of the both light measurements.

With the above features the construction of the light measuring device capable of the partial as well as the mean light measurement can be simplified, while the operation can be made sure.

What we claim:

1. A light measuring device of a camera comprising:
   a light sensing element for measuring brightness of an object;
   a light condensing lens arranged before the light sensing element, said light condensing lens including a central first part and a marginal second part having different light condensing characteristics, and said second part having a broader light measuring range than said first part; and
   an electrooptic light shading element for changing between the light measuring modes by partially shading the lens.

2. A device according to claim 1, wherein the electrooptic light shading element including a glass base plate, and a pair of electrodes with a central hole through the electrodes, one of the electrodes being fixed on the glass base plate, and the other electrode being fixed on the lens.

3. A light measuring device for a camera comprising:
   a light sensing element for measuring the brightness of an object;
   a light condensing lens arranged before the light sensing element, said light condensing lens including a central first part and a marginal second part having different light condensing characteristics, and said second part having a broader light measuring range than said first part;
   a first electrooptic light shading element for changing between light measurement modes by partially shading the lens; and
   a second electrooptic light shading element for partially shading the lens, said element maintaining the output level of the light sensing element almost equal when the light measuring mode is changed.

4. A device according to claim 3, wherein the first and second electrooptic elements have first, second and third glass base plates in common, and electrodes with respective patterns on each of the surfaces of the glass base plates opposed to each other.

* * * * *